(No Model.) 5 Sheets—Sheet 1.
J. BRAUN.
HAY OR HOG RACK.
No. 362,356. Patented May 3, 1887.
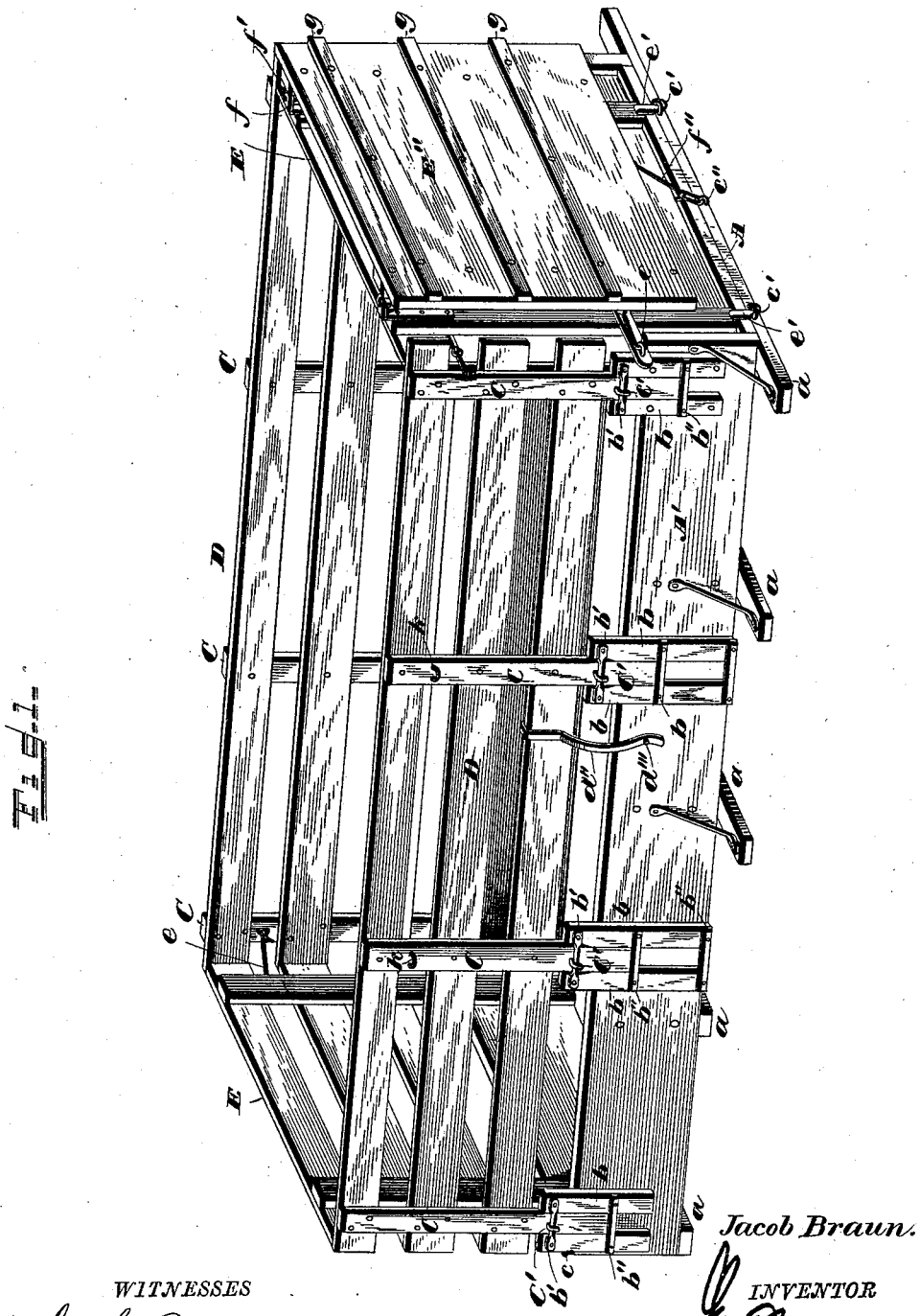
WITNESSES
G. S. Elliott
E. H. Johnson
Jacob Braun.
INVENTOR
Attorney

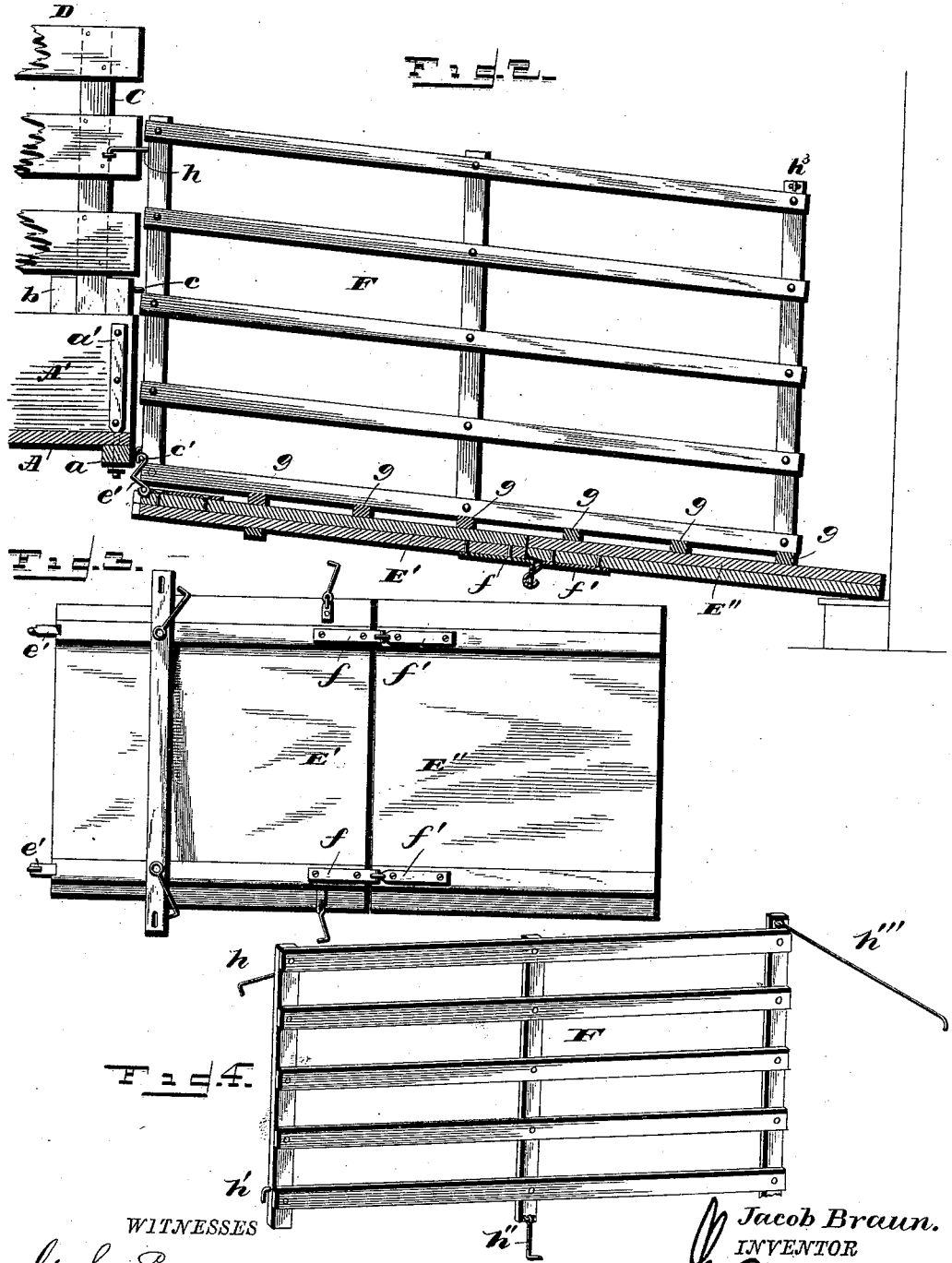

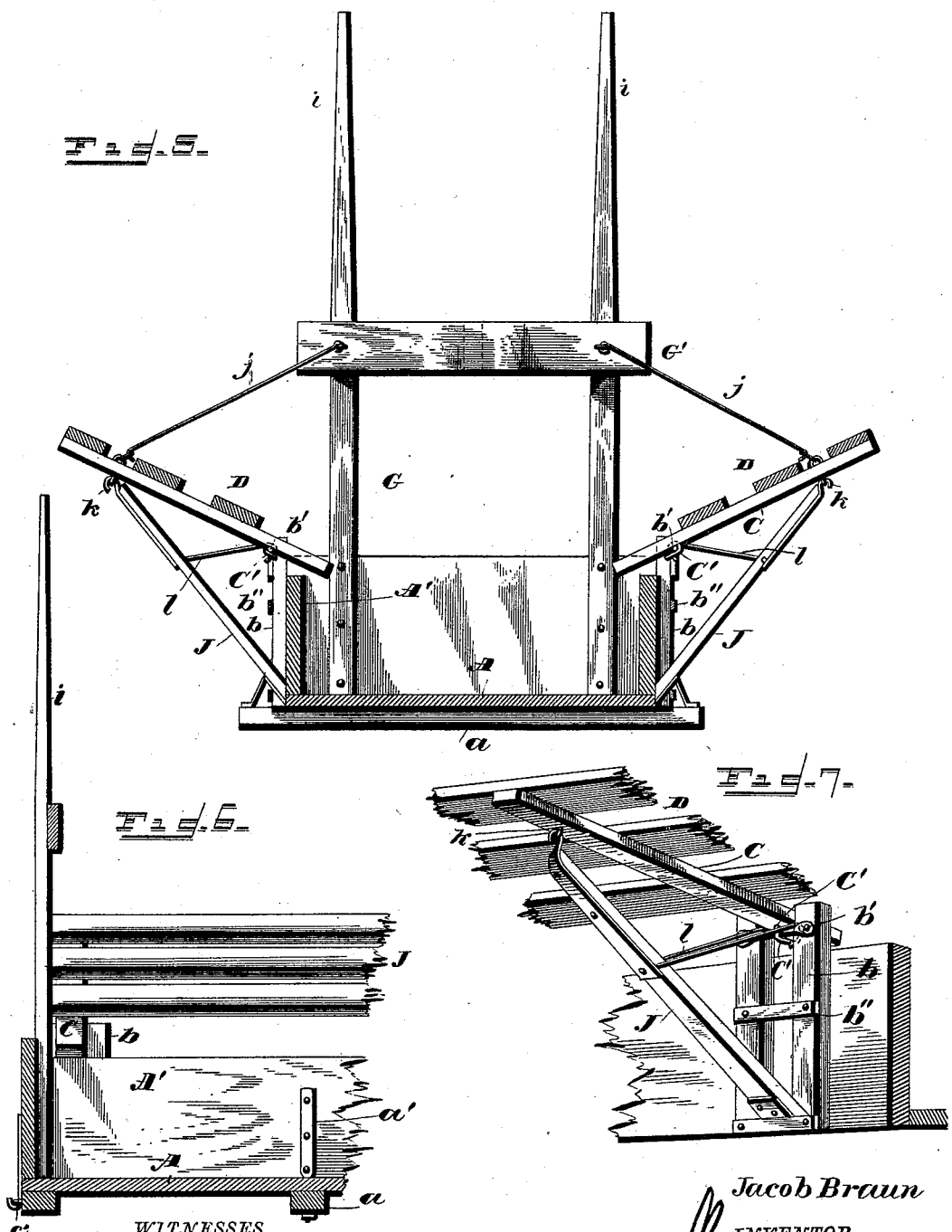

(No Model.) 5 Sheets—Sheet 4.
J. BRAUN.
HAY OR HOG RACK.
No. 362,356. Patented May 3, 1887.
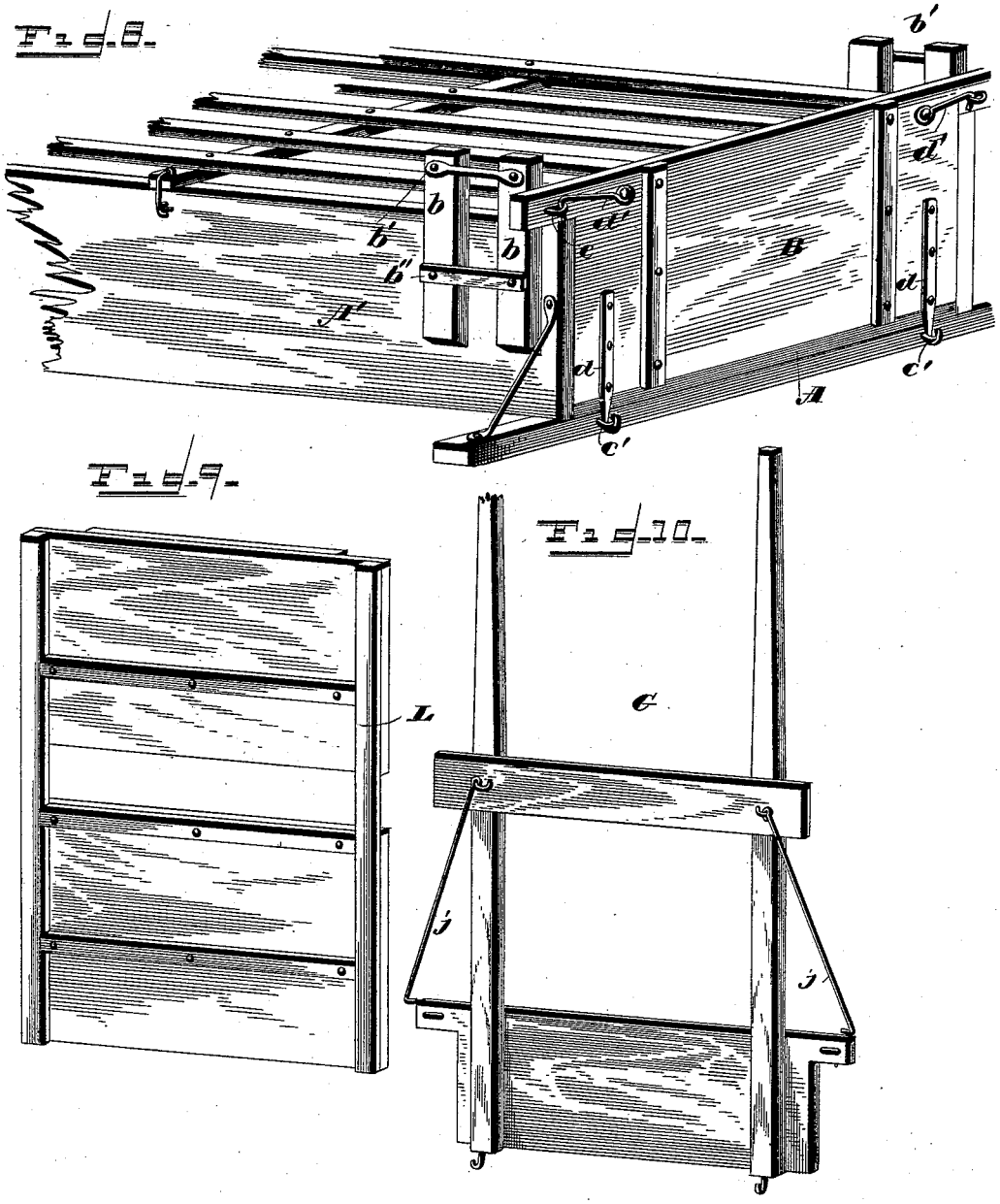
WITNESSES
Jacob Braun
INVENTOR
Attorney (No Model.)
5 Sheets—Sheet 5.
J. BRAUN.
HAY OR HOG RACK.
No. 362,356.
Patented May 3, 1887.
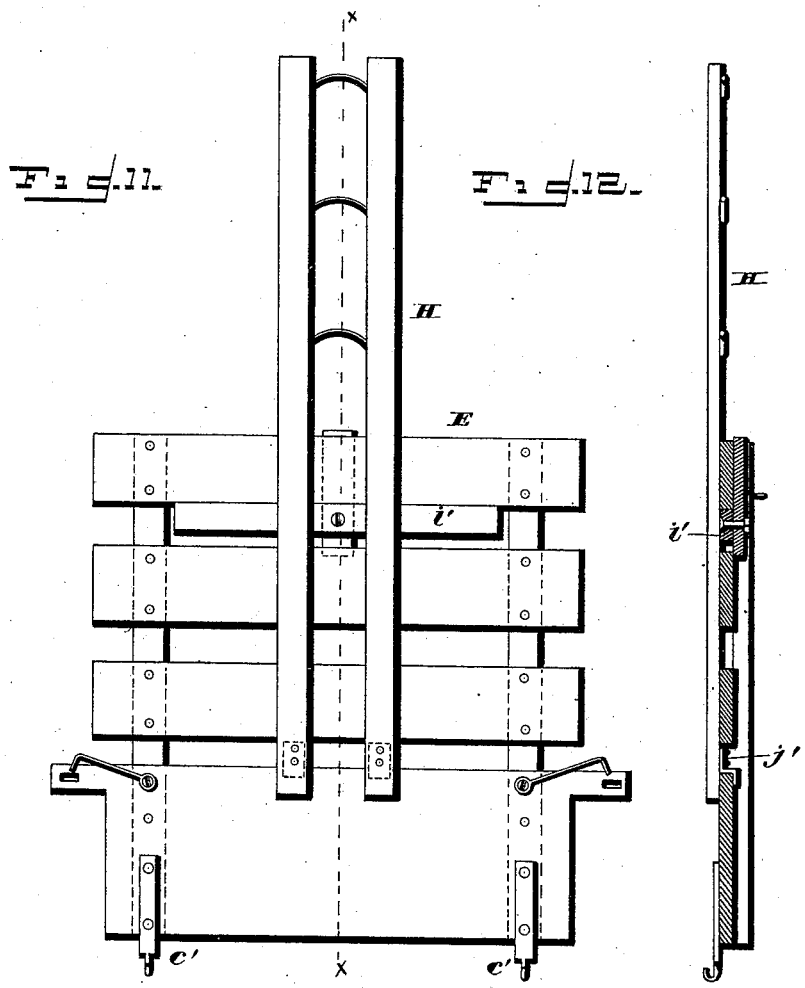
WITNESSES
Jacob Braun
INVENTOR
Attorney

UNITED STATES PATENT OFFICE.

JACOB BRAUN, OF BISMARCK, OHIO.

HAY OR HOG RACK.

SPECIFICATION forming part of Letters Patent No. 362,356, dated May 3, 1887.

Application filed January 13, 1887. Serial No. 224,257. (No model.)

*To all whom it may concern:*

Be it known that I, JACOB BRAUN, a citizen of the United States of America, residing at Bismarck, in the county of Huron and State of Ohio, have invented certain new and useful Improvements in Hay or Hog Racks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in attachments for farm-wagons, the object of my invention being to provide a device which can be attached to a farm-wagon, so as to provide a means whereby the sides and ends may be extended vertically to form a frame-work or box which will be convenient for transporting live stock; also, to provide a means for employing the side pieces to form a hay-rack, another object of my invention being to provide means whereby a closed box can be constructed suitable for the transportation of poultry; a further object of my invention also being to provide an inclined way or platform from the rear end of the wagon to the ground and side pieces therefor.

With the above ends in view my invention consists in the construction and combination of the parts, whereby they are interchangeable and serve different purposes, as will be hereinafter set forth.

My invention further consists in the special construction, combination, and organization of the parts, whereby they can be employed for different purposes.

In the accompanying drawings, which illustrate my invention, Figure 1 is a perspective view of a wagon-body, showing the parts of my improvements attached thereto, so as to adapt said body for transporting live stock—as hogs, sheep, &c. Fig. 2 is a detail longitudinal section showing the end-boards utilized as a platform, side pieces being attached thereto. Fig. 3 is a plan view of the under side of the combined platform and end-gate. Fig. 4 is detail perspective view of one of the vertical side pieces of the platform, showing the same detached from the wagon-body. Fig. 5 is a transverse sectional view through the wagon-body, looking toward the rear end, having the parts organized for use as a hay-rack. Fig. 6 is a longitudinal sectional view taken through the front portion of the wagon-body. Fig. 7 is a detail perspective view, partly in section, showing one of the supports for the inclined sides of the hay-rack. Fig. 8 is a detail perspective view showing the side pieces of the platform employed as a cover for the wagon-body. Fig. 9 is a perspective view of one of the rear end pieces which may be employed with the rear standards to form a closed back. Fig. 10 is a perspective view of the rear standards. Fig. 11 is a view of the front end of the wagon-body with the upright and front end-gate in place, and Fig. 12 is a vertical sectional view of the same.

In the accompanying drawings, A refers to the bottom board of the wagon-body, which is provided at suitable intervals with the usual transverse cross-bars, $a$, to which the vertical side pieces A' of the wagon-body are secured by means of bars $a'$, having flattened ends which are attached to the inner sides of the pieces A', the lower ends being provided with bolts, which bear upon the transverse strips $a$, thus securing the longitudinal side pieces and bottom boards rigidly, though removably, to the transverse bars $a$.

To the outer sides of the longitudinal side pieces A' are secured short parallel posts $b$ $b$, which extend above the side pieces, these posts being connected to each other at their upper ends by rounded bars $b'$, beneath which are located flat strips $b''$, which provide with the posts sockets within which the ends of the standards attached to the removable side pieces may be placed. The posts $b$ at the front and rear ends of the wagon-body are provided with staples or eyes $c$, and the end cross-bars, $a$, are also provided with eyes $c'$, and the rear bar, in addition to the side staples or eyes, $c'$, is also provided with an eye, $c''$, which may be provided with a staple split ring.

When it is desired to use the wagon-body, hereinbefore described, as an ordinary box-wagon, I employ end-gates, as referred to by B, said end-gates being adapted to be attached to the front and rear ends of the longitudinal side pieces A', said end-gates being provided at their lower ends with stationary hooks $d$, which engage with the staples $c'$ and with pivoted hooks $d'$, which engage with the staples $c$, which project from the post $b$, as fully shown in Fig. 8 of the accompanying drawings.

In Fig. 8 of the drawings I have also shown the wagon-body provided with a cover, which adapts the same to be used for transporting poultry. This cover consists of a series of longitudinal and transverse bars, which are bolted together, so that the bars may be moved parallel toward each other, the central bars having hooks which engage with eyes attached near the upper edges of the side pieces A' of the wagon-body. These pieces, which are employed for the top, are also employed to form vertical sides for the platform. One of the end gates is employed at the bottom of the platform and used for loading live stock in the wagon, as shown in Fig. 2 of the drawings.

When it is desired to use the wagon-body for transporting live stock—as hogs, sheep, calves, &c.—and provide the same with raised sides, I first remove the end-boards B, and lay them aside and place between the posts $b$ $b$ the ends of the bars C of the side frames, D, said bars or posts C being provided with hooks C'. which are adapted to engage with the rounded bars $b'$ at the upper ends of the posts $b$, and to prevent the vertical displacement of the side frames, D, I employ a bent bar, $d''$, the upper end of which is bent upon itself, so as to overlap the upper edge of the lower horizontal rail of the frame D, said bent bar being curved outwardly at its central portion and provided at its lower end with a perforation through which passes a pin, $d'''$, which projects from the side piece A of the wagon-body. The bar $d''$ being of spring metal and having an outwardly-curved portion, when forced over the pin it will remain in position, and when in position will exert a spring-pressure, so as to hold the parts securely together.

In connection with the side pieces D, I employ front and rear gates, E and E', the front gate being provided with stationary and pivoted hooks, which are identical in construction with those employed on the end-gates B, and in addition to said hooks the front gate is provided, near its upper end, with hooks $e$, which engage with eyes or staples attached to the vertical posts C of the frames D, as shown in Fig. 1. The rear gate, E', is preferably made up of solid board, with vertical battens, and it is secured to the vertical side pieces D D in a similar manner to the front gate, E, though at its lower edge, immediately opposite the battens, the hooks $e'$ are bent, as shown in Fig. 2, and the lower edges of the vertical battens are recessed, so as to provide a space within which several hooks will lie when the gate is placed in a vertical position.

The end-gate E' is also provided at the upper end of the vertical battens with angle-irons $f$, which are provided with perforations for the reception of the hooks $f'$, attached to the section E'', which forms a portion of the platform, said section being adapted to be carried by the rear end-gate, as shown in Fig. 1; and to prevent the displacement of this end-gate the edge opposite the hooks $f'$ is provided with a hook, $f''$, which is adapted to engage with a ring attached to the eye $c''$. The rear end-gate, E', and the section E'' are provided with transverse strips $g\ g$, which will be located on the upper edge when said sections are employed as a platform for loading live stock into the wagon, as shown in Fig. 2.

By constructing the connections or hooks $e'$ $f f'$ as shown the sections E' and E'', when employed as a platform, will be located below the bottom board of the wagon, and will form a rigid structure.

The side pieces F, which are adapted to be used either as covers for the wagon-box, as hereinbefore described, or as a guideway in connection with the platform, as shown in Fig. 2, have hooks $h$, $h'$, $h''$, and $h^3$, for attaching the same to the wagon-body and vertical extensions thereof, as well as the upper ends, to each other, so as to prevent lateral movement. The sections F, when not used in connection with the platform, may be attached to the side pieces D, or may be placed and suitably secured above the same, so as to provide a top for the side pieces D.

When it is desired to use the wagon-body for carrying hay or straw, the parts are organized as shown in Figs. 5, 6, and 7—that is to say, the rear end piece, G, which consists of a gate which is similar in construction to that heretofore described and referred to by B, is secured to the end of the wagon, said end-gate having vertical bars $i\ i$ rigidly secured to the same, said bars being connected to each other by horizontal board G', which has attached thereto rods $j$, the construction of which is fully shown in Fig. 10 of the drawings; and the front section or end-gate, E, has secured thereto an upright, H, which consists of two vertical bars, which are connected to each other by loops, under which the binding-pole, which is placed over the top of the load, is passed. These vertical uprights are also provided with a transverse strip, $i'$, to the front side of which is secured a turn-button, which will engage with the horizontal bars of the section E, and the lower ends of the vertical bars are provided with feet $j'$, which embrace the upper edge of one of the horizontal bars of said section E. After the front and rear portions, G and H, have been placed in position, the lower ends of the side pieces are placed so that the hooks C' will engage with the rounded bars $b'$, and said side pieces are maintained in an inclined position by means of brace-bars J, the lower ends of which bear upon the lower cross-bars, $b''$, while the opposite ends are provided with hooks, which engage with eyes $k$, attached to the side pieces. These brace-bars J are also provided with loops $l$, the ends of which are hooked, so as to engage with the bar $b'$. The front and end sections of the hay-rack may be provided with bars $j$, which will serve to bind the front, rear, and side sections to each other.

If desired, the end sections, E' and E'', may be dispensed with, and instead of the same I may employ a section, as shown in Fig. 9 of the drawings, which is adapted to be placed upon the section G when it is desired to provide the wagon-body with raised vertical sides and ends, and when this section L is used in connection with the section G they may be utilized as a platform.

I am aware that prior to filing this application patents have been granted numbered 318,100, dated May 19, 1885, and 318,959, dated June 2, 1885; and I do not therefore claim as my invention what is shown or described in the aforesaid patents.

I claim—

1. In combination with a wagon-body constructed substantially as shown and provided with projecting pins $d$, side sections D, consisting of vertical posts and longitudinal rails, and a bent bar adapted to engage both the upper edge of one of the longitudinal rails and a pin, $d^3$, so as to hold the section D from vertical displacement, substantially as shown, and for the purpose set forth.

2. In combination with a wagon-body constructed substantially as shown, the side sections D, provided with hooks C' and eyes $k$, the bars J, having hooks adapted to engage the eyes $k$, and loops $l$, whereby the side sections can be maintained in an inclined position with respect to the wagon-body, substantially as shown, and for the purpose set forth.

3. In combination with a wagon-body constructed substantially as described, the side sections D, provided with means for maintaining them in either a vertical or inclined position with respect to the wagon-body, and end-gates E and G, provided at their lower edges with hooks and adjacent to the upper edge of the wagon-body with slotted extensions and pivoted hooks, so as to provide means for securing said end-gates in a vertical position to the wagon-body, substantially as shown, and for the purpose set forth.

4. In combination with a wagon-body having vertical side extensions or sections, the sections E' and E'' and sections F, consisting of vertical and longitudinal slats pivotally connected to each other and provided with hooks for securing the same to the wagon-body and to the side sections, so as to maintain them in a vertical position above the platform, substantially as shown, and for the purpose set forth.

5. In combination with a farm-wagon, the front end-gate, E, adapted to be secured thereto in a vertical position, a removable section, H, consisting of vertical bars connected to each other at their upper ends by transverse bars, a transverse bar, $i'$, having a turn-button, and feet $j'$, the parts being organized substantially as shown, and for the purpose set forth.

In testimony whereof I affix my signature in presence of two witnesses.

JACOB BRAUN.

Witnesses:
JACOB MILLER,
HENRY HEYMAN.